United States Patent
Jain et al.

(10) Patent No.: US 10,108,617 B2
(45) Date of Patent: Oct. 23, 2018

(54) USING AUDIO CUES TO IMPROVE OBJECT RETRIEVAL IN VIDEO

(71) Applicant: Texas Instruments Incorporated, Dallas, TX (US)

(72) Inventors: Eakta Jain, Dallas, TX (US); Peter Charles Barnum, Berkeley, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 267 days.

(21) Appl. No.: 14/067,923

(22) Filed: Oct. 30, 2013

(65) Prior Publication Data
US 2015/0120726 A1 Apr. 30, 2015

(51) Int. Cl.
*G06F 17/30* (2006.01)
*G11B 27/30* (2006.01)
*H04N 5/77* (2006.01)
*G11B 27/28* (2006.01)

(52) U.S. Cl.
CPC .. *G06F 17/30023* (2013.01); *G06F 17/30787* (2013.01); *G11B 27/28* (2013.01); *G11B 27/30* (2013.01); *H04N 5/77* (2013.01)

(58) Field of Classification Search
CPC .................................................. G06F 17/30256
USPC ........................................ 707/705, 706, 707
See application file for complete search history.

(56) References Cited

U.S. PATENT DOCUMENTS

| | | | | |
|---|---|---|---|---|
| 4,567,531 A * | 1/1986 | Tabata | ................. | G11B 27/005 348/468 |
| 8,364,673 B2 * | 1/2013 | Chang | ............... | G06F 17/30274 707/728 |
| 8,868,590 B1 * | 10/2014 | Donneau-Golencer | ..................... | G06F 17/3053 707/733 |
| 9,711,182 B2 * | 7/2017 | Dharssi | ................ | G11B 27/036 |
| 2004/0267740 A1 * | 12/2004 | Liu | ................... | G06F 17/30256 |
| 2005/0010553 A1 * | 1/2005 | Liu | ................... | G06F 17/30265 |
| 2006/0004579 A1 * | 1/2006 | Claudatos | .......... | G08B 13/1672 704/270 |
| 2006/0004580 A1 * | 1/2006 | Claudatos | .......... | G08B 13/1672 704/275 |
| 2006/0004582 A1 * | 1/2006 | Claudatos | .......... | G08B 13/1672 704/275 |

(Continued)

OTHER PUBLICATIONS

Carl Vondrick et al, "HOGgles: Visualizing Object Detection Features", pp. 1-8, available at http://mit.edu/vondrick/ihog on Oct. 23, 2013.

(Continued)

*Primary Examiner* — Baoquoc N To
(74) *Attorney, Agent, or Firm* — Gregory J. Albin; Charles A. Brill; Frank D. Cimino (57) ABSTRACT

A method of object retrieval from visual data is provided that includes annotating at least one portion of the visual data with a context keyword corresponding to an object, wherein the annotating is performed responsive to recognition of the context keyword in audio data corresponding to the at least one portion of the visual data, receiving a query to retrieve the object, wherein the query includes a query keyword associated with both the object and the context keyword, identifying the at least one portion of the visual data based on the context keyword, and searching for the object in the at least one portion of the visual data using an appearance model corresponding to the query keyword.

5 Claims, 4 Drawing Sheets

(56) References Cited

U.S. PATENT DOCUMENTS

| | | | |
|---|---|---|---|
| 2008/0201314 A1* | 8/2008 | Smith | G06F 17/30017 |
| 2008/0250011 A1* | 10/2008 | Haubold | G06F 17/30023 |
| 2008/0281793 A1* | 11/2008 | Mathur | G06F 17/30023 |
| 2010/0306197 A1* | 12/2010 | Jin | G06F 17/30781 707/736 |
| 2010/0306232 A1* | 12/2010 | Heminghous | G06F 17/30781 707/769 |
| 2010/0306796 A1* | 12/2010 | McDonald | G06F 17/30781 725/32 |
| 2011/0047163 A1* | 2/2011 | Chechik | G06F 17/30781 707/741 |
| 2011/0081075 A1* | 4/2011 | Adcock | G06K 9/00751 382/165 |
| 2011/0314485 A1* | 12/2011 | Abed | G06F 17/30796 725/14 |
| 2013/0291008 A1* | 10/2013 | Abed | H04N 7/0882 725/32 |
| 2014/0129942 A1* | 5/2014 | Rathod | H04N 21/44222 715/720 |
| 2014/0258002 A1* | 9/2014 | Zimmerman | G06Q 30/0256 705/14.72 |
| 2014/0278985 A1* | 9/2014 | Ramakrishnan | G06Q 30/0256 705/14.54 |
| 2014/0363143 A1* | 12/2014 | Dharssi | G06K 9/00765 386/282 |

OTHER PUBLICATIONS

Xi Li et al, "A Survey of Appearance Models in Visual Object Tracking", ACM Transactions on Intelligent Systems and Technology, Mar. 20, 2013, pp. 1-42.

* cited by examiner

USING AUDIO CUES TO IMPROVE OBJECT RETRIEVAL IN VIDEO

BACKGROUND OF THE INVENTION

Field of the Invention

Embodiments of the present invention generally relate to using audio cues to improve retrieval of objects from visual data, e.g., video frames from one or more video cameras.

Description of the Related Art

The ubiquitous presence of cameras in our personal environments such as wearable cameras, e.g., augmented reality (AR) glasses, surveillance devices in smart homes, or video sensors in smart appliances, allows for the deployment of object retrieval applications for real world use. An example of an object retrieval application is a user asking her AR glasses or her smart home console "Where did I put my car keys?" Object retrieval in real world applications is a difficult problem because the desired object may be captured by a camera in a variety of poses, under varying illumination, and with arbitrary amounts of occlusion. Further, large amounts of video data may need to be searched in the attempt to locate the desired object.

SUMMARY

Embodiments of the present invention relate to methods and systems for using audio cues to improve object retrieval in video. In one aspect, a method of object retrieval from visual data is provided that includes annotating at least one portion of the visual data with a context keyword corresponding to an object, wherein the annotating is performed responsive to recognition of the context keyword in audio data corresponding to the at least one portion of the visual data, receiving a query to retrieve the object, wherein the query includes a query keyword associated with both the object and the context keyword, identifying the at least one portion of the visual data based on the context keyword, and searching for the object in the at least one portion of the visual data using an appearance model corresponding to the query keyword.

In one aspect, a digital system configured to perform object retrieval from visual data is provided. The digital system includes means for capturing the visual data and corresponding audio data, means for annotating at least one portion of the visual data with a context keyword corresponding to an object, wherein the annotating is performed responsive to recognition of the context keyword in audio data corresponding to the at least one portion of the visual data, means for receiving a query to retrieve the object, wherein the query includes a query keyword associated with both the object and the context keyword, means for identifying the at least one portion of the visual data based on the context keyword, and means for searching for the object in the at least one portion of the visual data using an appearance model corresponding to the query keyword.

In one aspect, a method of object retrieval from visual data in a digital system is provided that includes receiving video frames and corresponding audio frames, annotating some of the video frames with audio cues recognized from corresponding audio frames, and retrieving objects from annotated video frames using the audio cues.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

As previously mentioned, object retrieval for real world, e.g., consumer, applications, is a difficult problem due to the large amount of video data that may need to be searched to locate an object and the varying conditions under which images of objects may be captured. Further, for a query such as "Where did I put my car keys?", the time period in the stored video that should be searched, e.g., the past 30 seconds, the past 24 hours, or the past 30 days, is unclear.

Embodiments of the invention provide for object retrieval that utilizes audio cues integrated with captured video frames to provide additional context for retrieval of objects from captured visual data (video frames). More specifically, audio data is captured in conjunction with the capture of visual data, and the visual data is annotated with any context keywords recognized in the audio data. A learned set of appearance models for objects that may be retrieved from the visual data along with associated query keywords for the objects is provided. The query keywords are mapped to context keywords, i.e., words and phrases that may occur in the context in which a particular object may be present. A user may trigger an attempt to retrieve an object from the visual data by entering or saying a query keyword or keywords associate with the object. Based on the query keyword(s), a learned appearance model of the object is retrieved as well as any context keyword(s) associated with the query keyword(s). Timestamps in the video data around when the context keyword(s) were used are identified and the video data within these timestamps is searched to attempt to locate the object. If the object is located, the location is communicated to the user.

Figure 1:
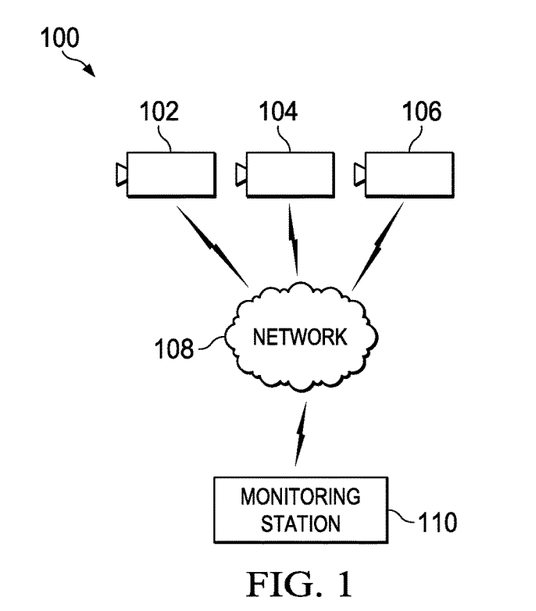
FIG. 1 is a block diagram of an example home monitoring system.
Figure 4:
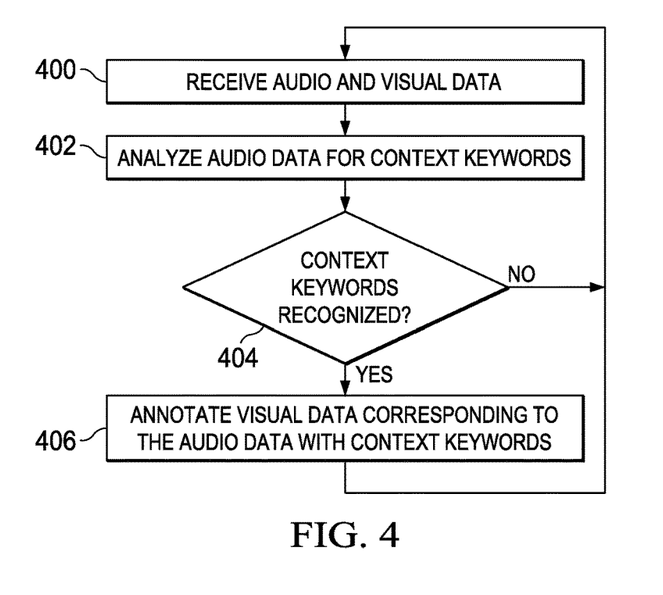
FIGS. 4 and 5 are flow diagrams of a method.
Figure 5:
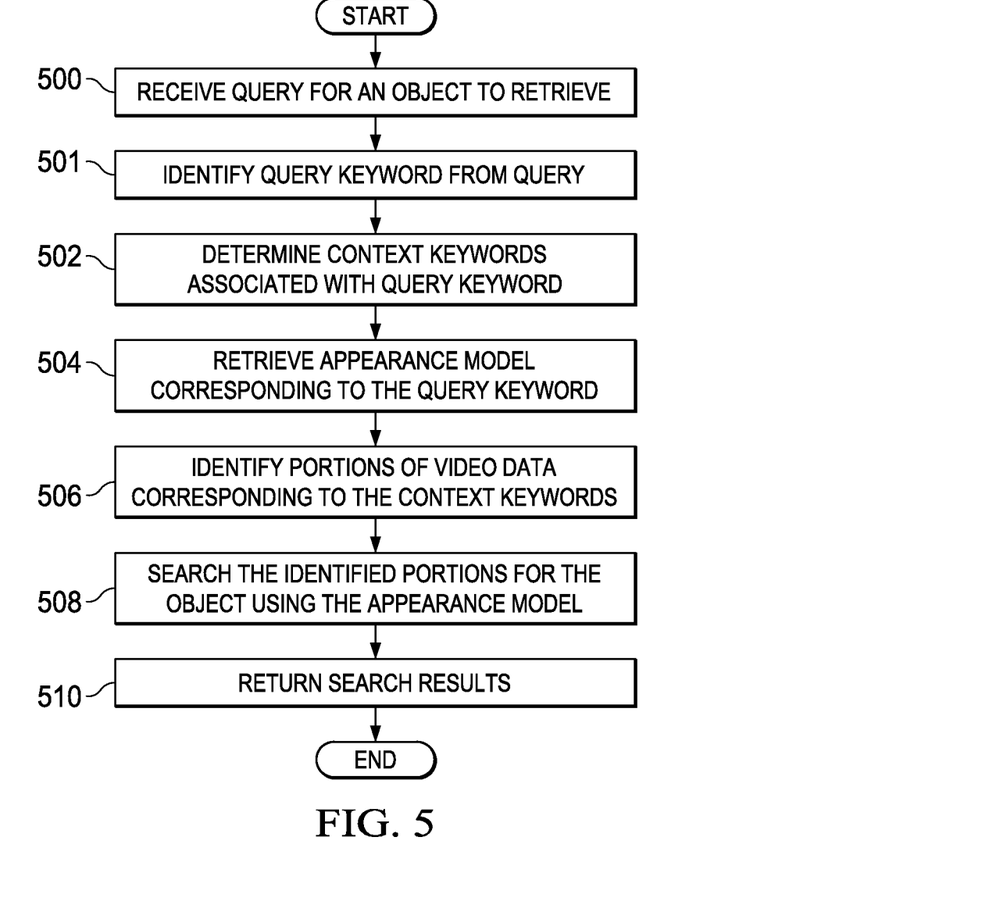

FIG. 1 is a block diagram of an example home monitoring network 100 configured to perform a method for using audio cues to retrieve objects from visual data as described herein in reference to FIGS. 4 and 5. The monitoring network 100 includes three video cameras 102, 104, 106 with audio capture capability, and a monitoring station 110 connected via a network 108. The network 108 may be any communication medium, or combination of communication media suitable for transmission of video and audio data captured by the cameras 102, 104, 106, such as, for example, wired or wireless communication media, a local area network, or a wide area network.

Three cameras are shown for illustrative purposes. One of ordinary skill in the art will understand that more or fewer cameras may be used and that other networked devices incorporating imaging and audio sensors may be included, e.g., wearable cameras, smart phones, etc in embodiments. Each of the cameras 102, 104, 108 includes functionality to capture images of a scene and audio signals occurring in the scene. The cameras 102, 104, 108 may be stationary, may pan a surveilled area, or a combination thereof. The cameras may include functionality for encoding and transmitting video and audio sequences to the monitoring system 110 or may be connected to a system (not specifically shown) that provides the encoding and/or transmission. Although not specifically shown, one or more of the cameras 102, 104, 106 may be directly connected to the monitoring system 110 via a wired interface instead of via the network 108. An example of a suitable camera is described in reference to FIG. 2.

The monitoring station 110 is configured to receive video and audio sequence(s) from the video cameras. The monitoring station 110 may be configured to generate audible and/or visual alarms in response to the detection of specified events and/or notify a security monitoring service or the home owner via a text message, a phone call, or the like when an alarm is signaled. Further, the monitoring station is configured to perform a method (described below in reference to FIGS. 4 and 5) for using audio cues to retrieve objects from visual data using the audio and visual data captured by the cameras. An example of a computer system suitable for use as the monitoring station 110 is described in reference to FIG. 3.

Figure 2:
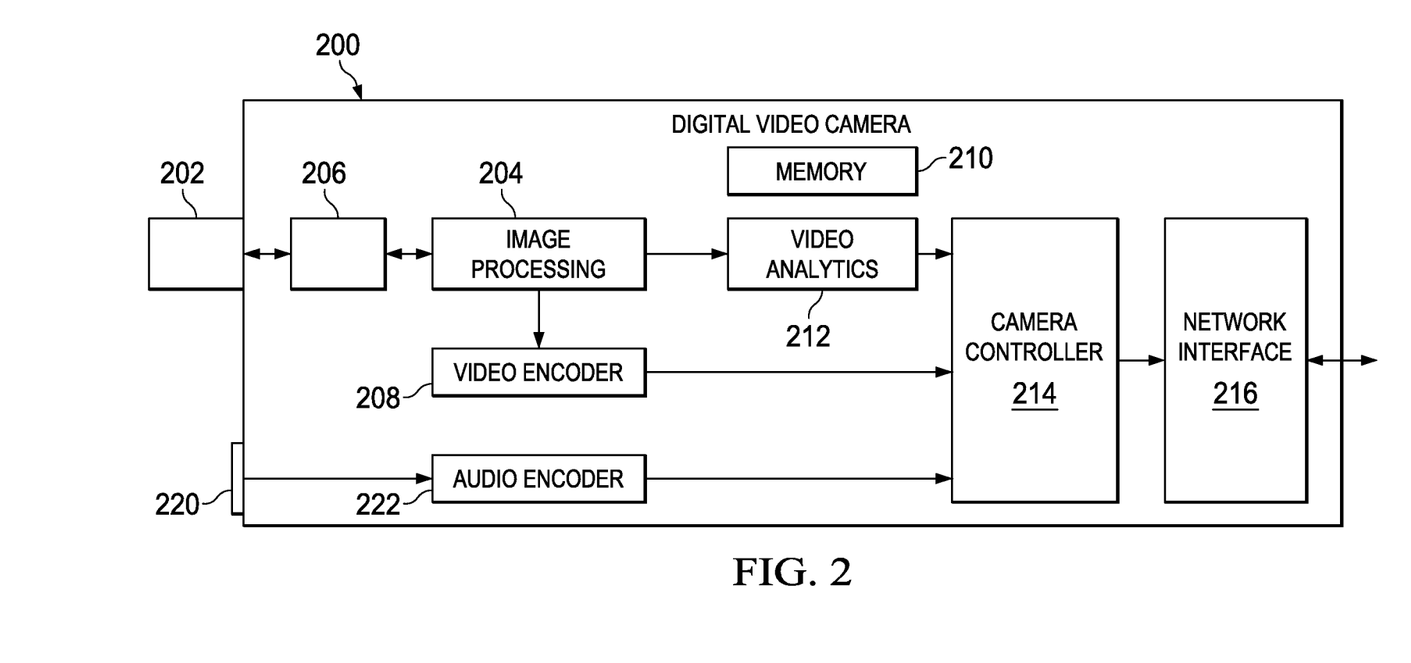
FIG. 2 is a block diagram of an example digital video camera.

FIG. 2 is a block diagram of an example digital video camera 200 suitable for use in the home monitoring network 100 of FIG. 1. The digital video camera 200 may be a standalone camera, or may be embedded in a device such as a mobile phone, a tablet computer, a wearable device such as eyeglasses, a handheld gaming device, etc. The camera 200 includes an imaging component 202, a controller component 206, an image processing component 204, a video encoder component 208, a memory component 210, a video analytics component 212, a camera controller 214, a microphone 220, an audio encoder component 222, and a network interface 216. The components of the camera 200 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

The imaging component 202 and the controller component 206 include functionality for capturing images of a scene. The imaging component 202 includes a lens assembly, a lens actuator, an aperture, and an imaging sensor. The imaging component 202 also includes circuitry for controlling various aspects of the operation of the component, such as, for example, aperture opening amount, exposure time, etc. The controller module 206 includes functionality to convey control information from the camera controller 214 to the imaging component 202, and to provide digital image signals to the image processing component 204.

The image processing component 204 divides the incoming digital signals into frames of pixels and processes each frame to enhance the image data in the frame. The processing performed may include one or more image enhancement techniques, such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment. Digital image from the image processing component 204 are provided to the video encoder component 208 and the video analytics component 212.

The video encoder component 208 encodes the images in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The microphone 220 captures an audio stream as the imaging component 202 and the controller component 206 captures a video stream and provides the audio stream to the audio encoder 222. The audio encoder 222 encodes frames of the audio data in accordance with a suitable audio encoding standard and provides the encoded audio frames to the camera controller component 214 for transmission.

The memory component 210 may be on-chip memory, external memory, or a combination thereof. Any suitable memory design may be used. For example, the memory component 210 may include static random access memory (SRAM), dynamic random access memory (DRAM), synchronous DRAM (SDRAM), read-only memory (ROM), flash memory, a combination thereof, or the like. Various components in the digital video camera 200 may store information in memory in the memory component 210 as a video stream or audio stream is processed. For example, the video encoder component 208 may store reference data in a memory of the memory component 210 for use in encoding frames in the video stream. Further, the memory component 210 may store any software instructions that are executed by one or more processors (not shown) to perform some or all of the described functionality of the various components.

The camera controller component 214 controls the overall functioning of the digital video camera 200. For example, the camera controller component 214 may adjust the focus and/or exposure of the imaging component 202 based on the focus quality and scene brightness, respectively, determined by the image processing component 204. The camera controller component 214 also controls the transmission of the encoded video stream and the encoded audio stream via the network interface component 216 and may control reception and response to camera control information received via the network interface component 216. Further, the camera controller component 214 controls the transfer of information from the video analytics component 212 via the network interface component 216.

The network interface component 216 allows the digital video camera 200 to communicate with a monitoring system, e.g., the monitoring station 110 of FIG. 1. The network interface component 216 may provide an interface for a wired connection, e.g., an Ethernet cable or the like, and/or for a wireless connection. The network interface component 216 may use any suitable network protocol(s).

The video analytics component 212 analyzes the content of images in the captured video stream to detect and determine temporal events not based on a single image. The analysis capabilities of the video analytics component 212 may vary in embodiments depending on such factors as the processing capability of the digital video camera 200, the particular application for which the digital video camera is being used, etc. For example, the analysis capabilities may range from video motion detection in which motion is detected with respect to a fixed background model to face recognition, object recognition, gesture recognition, feature detection and tracking, etc.

Figure 3:
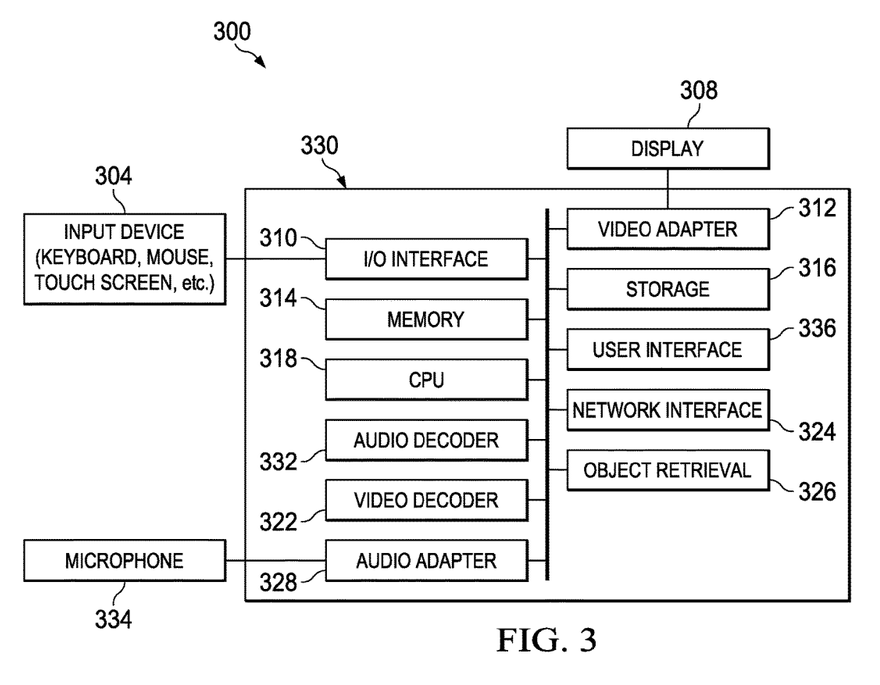
FIG. 3 is a block diagram of an example computer.

FIG. 3 is a block diagram of an example computer system 300 suitable for use as the monitoring station 110 in the home monitoring network of FIG. 1. The computer system 300 is configured to perform a method (described herein in reference to FIGS. 4 and 5) for using audio cues to retrieve objects from visual data as described herein using the audio and visual data captured by cameras such as those depicted in the home monitoring network of FIG. 1. The computer system 300 includes a processing unit 330 equipped with one or more input devices 304 (e.g., a mouse, a keyboard, or the like), and one or more output devices, such as a display 308, or the like. In some embodiments, the display 308 may be touch screen, thus allowing the display 308 to also function as an input device. The processing unit 330 may be, for example, a desktop computer, a workstation, a laptop computer, a tablet computer, a dedicated unit customized for a particular application, or the like. The display may be any suitable visual display unit such as, for example, a computer monitor, an LED, LCD, or plasma display, a television, a high definition television, or a combination thereof.

The processing unit 330 includes a central processing unit (CPU) 318, memory 314, a storage device 316, a video adapter 312, an I/O interface 310, a video decoder 322, an audio decoder 332, a microphone 334, an audio adaptor 328, an object retrieval component 326, a user interface component 336, and a network interface 324 connected to a bus. The bus may be one or more of any type of several bus architectures including a memory bus or memory controller, a peripheral bus, video bus, or the like.

The CPU 318 may be any type of electronic data processor. For example, the CPU 318 may be a processor from Intel Corp., a processor from Advanced Micro Devices, Inc., a Reduced Instruction Set Computer (RISC), an Application-Specific Integrated Circuit (ASIC), or the like. The memory 314 may be any type of system memory such as static random access memory (SRAM), dynamic random access memory (DRAM), synchronous DRAM (SDRAM), read-only memory (ROM), flash memory, a combination thereof, or the like. Further, the memory 314 may include ROM for use at boot-up, and DRAM for data storage for use while executing programs.

The storage device 316 (e.g., a computer readable medium) may comprise any type of storage device configured to store data, programs, and other information and to make the data, programs, and other information accessible via the bus. The storage device 316 stores software instructions that, when executed by the CPU 318, cause the processing unit 330 to monitor the digital video cameras of the home monitoring system and to perform a method for using audio cues to retrieve objects from visual data as described herein in relation to FIGS. 4 and 5 using the audio and visual data captured by the cameras. The storage device 316 may be, for example, one or more of a hard disk drive, a magnetic disk drive, an optical disk drive, or the like.

The software instructions may be initially stored in a computer-readable medium such as a compact disc (CD), a diskette, a tape, a file, memory, or any other computer readable storage device and loaded and executed by the CPU 318. In some cases, the software instructions may also be sold in a computer program product, which includes the computer-readable medium and packaging materials for the computer-readable medium. In some cases, the software instructions may be distributed to the computer system 300 via removable computer readable media (e.g., floppy disk, optical disk, flash memory, USB key), via a transmission path from computer readable media on another computer system (e.g., a server), etc.

The storage device 316 stores video and audio data received from the digital video cameras. Portions of the video data may be annotated by the object retrieval component 326 with context keywords identified (recognized) from corresponding audio data. Annotation of visual data with context keywords is explained in more detail in reference to the method of FIG. 4. The storage device 316 also stores appearance models of objects that may be retrieved by the object retrieval component 326, query keywords(s) corresponding to each of the appearance models, and the mapping between the query keywords and context keywords. Appearance models, query keywords, and context keywords are explained in more detail in reference to the methods of FIGS. 4 and 5.

The video adapter 312, the audio adaptor 328, and the I/O interface 310 provide interfaces to couple external input and output devices to the processing unit 330. As illustrated in FIG. 3, examples of input and output devices include the display 308 coupled to the video adapter 312, the microphone 334 coupled to the audio adaptor 328, and the mouse/keyboard 304 coupled to the I/O interface 310. The microphone 334 may be used to capture audio queries directed to the object retrieval component 326.

The network interface 324 allows the processing unit 330 to communicate with remote units via a network (not shown). In one or more embodiments, the network interface 324 allows the computer system 300 to communicate via a network to one or more digital video cameras to receive encoded video and audio sequences and other information transmitted by digital video camera(s). The network interface 324 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The computer system 310 may also include other components not specifically shown. For example, the computer system 310 may include power supplies, cables, a motherboard, removable storage media, cases, and the like.

The video decoder component 322 decodes frames in encoded video sequences received from the digital video cameras in accordance with a video compression standard used to encode the video sequences. The standard may be, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc. The decoded frames may be provided to the video adapter 312 for display on the display 308. The video decoder component 322 also provides the decoded frames to the object retrieval component 326.

The audio decoder component 332 decodes frames in encoded audio sequences received from the digital video cameras in accordance with the audio compression standard used to encode the audio sequences. The decoded audio frames may be provided to a speaker (not shown) for playback in conjunction with corresponding video frames shown on the display 308. The audio decoder component 332 also provides the decoded audio frames to the object retrieval component 326.

A user interface 336 may be implemented on the computer system 300 to enable a user to manage the home monitoring system and to submit textual and/or oral queries to the object retrieval module 326. The user interface 336 may include management functionality that allows a user to, for example, adjust the direction of the cameras, replay recorded video/audio, adjust motion sensitivity of the cameras, etc. As is explained in more detail herein, the query functionality allows the user to manually or orally enter query keywords for object retrieval from recorded video data.

The object retrieval component 326 includes functionality to receive audio and video streams (via the decoders 332, 322) from digital video cameras, to analyze the audio streams for the occurrence of context keywords, and to annotate corresponding frames in a video stream when context keywords are recognized. The annotated visual data is stored in the storage 316. The object retrieval component 326 also includes functionality to retrieve an object from the annotated visual data based on a query keyword(s) submitted by a user. User queries for object retrieval may be submitted orally and/or manually. Functionality of the object retrieval component 326 is explained in more detail in reference to the methods of FIGS. 4 and 5.

FIGS. 4 and 5 are flow diagrams of different aspects of a method for using audio cues to retrieve objects from visual data. FIG. 4 depicts the flow of annotating visual data with audio cues and FIG. 5 depicts the flow of retrieving objects from the visual data using the audio cues. For simplicity of explanation, the method is explained in the context of the above described home monitoring system (FIGS. 1-3). One of ordinary skill in the art, having benefit of this description, will understand method embodiments in other contexts wired for video and audio capture, e.g., operating rooms, businesses, intelligent surveillance systems, etc.

The method assumes a set of learned appearance models for objects that may be retrieved is stored in the storage device 316 along with associated query keywords that a user may use to trigger attempts to retrieve of the objects. For example, the query keyword "key" and/or "keys" may be associated with an appearance model for a key or a set of keys. In another example, the query keyword "sunglasses" may be associated with an appearance model for sunglasses. In another example, the query keyword "wallet" may be associated with an appearance model for a wallet. In general, an appearance model is a representation of how an object might appear in a video frame. Any suitable implementation technique for appearance models may be used, e.g., edge maps or histogram of gradients (HOG) features. Examples of suitable appearance models are described in X. Li, et al., "A Survey of Appearance Models in Visual Object Tracking," ACM Transactions on Intelligent Systems and Technology (TIST), Vol. 4, Issue 6, Article No. 58, pp. 1-42, September, 2013 and C. Vondrick, et al., "HOGgles: Visualizing Object Detection Features," pp. 1-8, http://web.mit.edu/vondrick/ihog/iccv.pdf, Oct. 22, 2013.

The method also assumes that context keywords associated with the query keywords are stored in the storage device 316. Context keywords are words that may occur in an audio stream when a particular object may be present in the video stream being captured. For example, context keywords for keys, wallet, and/or sunglasses may be "I'm home" or "I'm going to the store." In another example, context keywords for wallet may also be "Can I borrow $10?". Any number of context keywords may be associated with a particular query keyword and context keywords may be associated with more than one query keyword.

In some embodiments, the learned appearance models, associated query keywords, and associated context keywords may be pre-determined, e.g., supplied as factory defaults in the home monitoring system 100. In some embodiments, the monitoring station 110 may include functionality to allow a user to add learned appearance models and to modify or add query keywords and context keywords. Appearance models may be learned, for example, by taking pictures of objects (e.g., keys, wallet, sunglasses, etc.) and computing appearance models from the pictures.

FIG. 4 illustrates annotation of visual data with audio cues (context keywords). This portion of the method, which may be referred to as preprocessing of visual data and is performed by the object retrieval component 326, happens continuously and contiguously with the capture of video and audio in the home monitoring system 100. Associated audio and visual data, e.g., the audio and video data from a camera, are received 400 by the object retrieval component 326, and the audio data is analyzed 402 for the occurrence of context keywords. That is, if speech is present in the audio stream, speech recognition is performed to determine if any of the context keywords have occurred. Any suitable techniques may be used for detecting the presence of speech in the audio stream and for speech recognition. If context keywords are recognized 404, the visual data corresponding to the audio data containing the context keywords is annotated to associate the context keywords with one or more frames of the visual data. Processing then continues on the received audio and visual data 400. If context keywords are not recognized, 404, processing continues on the received audio and visual data 400.

FIG. 5 illustrates object retrieval from the preprocessed visual data with associated audio cues (context keywords). This portion of the method is also performed by the object retrieval component 326. Initially, a query identifying an object to retrieve from the preprocessed visual data is received 500. The query may be oral, e.g., received via the microphone 334 or the user may enter the query manually via the user interface 336 using an input device 304. A query keyword is then identified 501 from the query. If the query is oral, speech recognition is performed to identify the query keyword. If the query is textual, the query text may be parsed to identify the query keyword. For example, if the query is "Where are my keys?", the identified query keyword may be "keys" or "key".

Context keywords associated with the query keyword are then determined 502 and the appearance model associated with the query keyword is also retrieved 504. For example, if the query keyword is "key", the appearance model associated with "key" is retrieved and the associated context keywords may be "I'm home" and/or "I'm back from the store."

Portions of the preprocessed visual data corresponding to the context keywords are then identified 506, i.e., video frames annotated with the context keywords are identified. The identified portions of the video data are then searched 508 for the object using the appearance model. The search results are then returned 510 to the user. For example, the video frame in which the object was located may be returned. Note that rather than searching all of the visual data for the desired object, the search is restricted to those frames where the object is most likely to be found as indicated by the associated context keywords.

Other Embodiments

While the invention has been described with respect to a limited number of embodiments, those skilled in the art, having benefit of this disclosure, will appreciate that other embodiments can be devised which do not depart from the scope of the invention as disclosed herein. For example, embodiments have been described in which the system providing the capturing of audio and video, the annotation of the video with audio cues, and the retrieval functionality are integrated into an environment such as a home. One of ordinary skill in the art will understand embodiments in which a wearable device with audio and video capture capability, e.g., Google Glasses, may implement an embodiment of the method.

It is therefore contemplated that the appended claims will cover any such modifications of the embodiments as fall within the true scope of the invention.

What is claimed is:

1. A method of object retrieval from visual data, the method comprising:
   annotating at least one portion of the visual data with a context keyword corresponding to an object, wherein the annotating is performed responsive to recognition of the context keyword by performing speech recognition in audio data corresponding to the at least one portion of the visual data;
   receiving a query to retrieve the object, wherein the query comprises a query keyword associated with both the object and the context keyword;
   identifying the at least one portion of the visual data based on the context keyword; and
   searching for the object in the at least one portion of the visual data using an appearance model corresponding to the query keyword.

2. The method of claim 1, wherein the appearance model, the corresponding query keyword, and the context keyword are predetermined.

3. A digital system configured to perform object retrieval from visual data, the digital system comprising one or more processors configured to:
   capture the visual data and corresponding audio data;
   annotate at least one portion of the visual data with a context keyword that is obtained from audio data corresponding to the at least one portion of the visual data;
   receive a query to retrieve an object, wherein the query comprises a query keyword associated with both the object and the context keyword;
   identify the at least one portion of the visual data based on the context keyword; and
   search for the object in the at least one portion of the visual data using an appearance model corresponding to the query keyword.

4. The digital system of claim 3, wherein the appearance model, the corresponding query keyword, and the context keyword are predetermined.

5. The digital system of claim 3, wherein the context keyword is obtained by speech recognition from the audio data corresponding to the at least one portion of the visual data.

* * * * *